United States Patent
Lu et al.

(10) Patent No.: US 12,117,566 B2
(45) Date of Patent: Oct. 15, 2024

(54) FEED-FORWARD EQUALIZATION FOR ENHANCED DISTANCE RESOLUTION

(71) Applicant: Beijing Voyager Technology Co., Ltd., Beijing (CN)

(72) Inventors: Yue Lu, Mountain View, CA (US); Vipul Chawla, Mountain View, CA (US); Youmin Wang, Youmin, CA (US)

(73) Assignee: Beijing Voyager Technology Co., Ltd., Beijing (CN)

( * ) Notice: Subject to any disclaimer, the term of this patent is extended or adjusted under 35 U.S.C. 154(b) by 871 days.

(21) Appl. No.: 17/216,284

(22) Filed: Mar. 29, 2021

(65) Prior Publication Data

US 2022/0308188 A1 Sep. 29, 2022

(51) Int. Cl.
*G01S 7/48* (2006.01)
*G01S 7/4865* (2020.01)
*G01S 17/10* (2020.01)
*G01S 17/931* (2020.01)

(52) U.S. Cl.
CPC ............ *G01S 7/4865* (2013.01); *G01S 17/10* (2013.01); *G01S 17/931* (2020.01)

(58) Field of Classification Search
None
See application file for complete search history.

(56) References Cited

U.S. PATENT DOCUMENTS

| | | |
|---|---|---|
| 6,499,662 B1 | 12/2002 | Coleman et al. |
| 2005/0135472 A1 | 6/2005 | Higashino |
| 2008/0199191 A1 | 8/2008 | Essiambre et al. |
| 2011/0158419 A1 | 6/2011 | Theverapperuma et al. |
| 2015/0295650 A1 | 10/2015 | Lee et al. |
| 2016/0299219 A1* | 10/2016 | Suzuki ................. G01S 7/4868 |
| 2018/0164414 A1 | 6/2018 | Gnecchi et al. |
| 2018/0259625 A1 | 9/2018 | Gnecchi et al. |
| 2020/0278427 A1 | 9/2020 | Chen et al. |

FOREIGN PATENT DOCUMENTS

| | | |
|---|---|---|
| CN | 202092781 U | 12/2011 |
| JP | 5646640 B2 | 11/2014 |
| JP | 2020053016 A | 4/2020 |
| KR | 20180130381 A | 12/2018 |

OTHER PUBLICATIONS

International Search Report and Written Opinion for PCT Application No. PCT/US2022/019904, Mailed On Jun. 27, 2022, 11 pages.

* cited by examiner

*Primary Examiner* — Hovhannes Baghdasaryan
(74) *Attorney, Agent, or Firm* — Kilpatrick Townsend & Stockton LLP

(57) ABSTRACT

Apparatus and methods for reducing inter symbol interference from reflected laser pulses that are received close in time. A laser is provided to emit a laser beam pulse. A photodetector is mounted to receive a reflected laser beam pulse after reflecting off an object in an external environment, and produce a voltage signal corresponding to the reflected laser beam pulse. The voltage signal is provided to a delay path circuit having a delay line and a gain control circuit to provide a delayed, reduced amplitude voltage signal. The delayed, reduced amplitude voltage signal is subtracted from the voltage signal in a subtraction circuit to produce a truncated pulse. The output of the subtraction circuit is provided to a pulse detector circuit to detect the arrival time of the leading edge of the truncated pulse.

20 Claims, 11 Drawing Sheets

FEED-FORWARD EQUALIZATION FOR ENHANCED DISTANCE RESOLUTION

BACKGROUND OF THE INVENTION

Unless otherwise indicated herein, the materials described in this section are not prior art to the claims in this application and are not admitted to be prior art by inclusion in this section. In particular, disparate technologies are discussed that it would not be obvious to discuss together absent the teachings of the present invention.

Modern vehicles are often equipped with sensors designed to detect objects and landscape features around the vehicle in real-time to enable technologies such as lane change assistance, collision avoidance, and autonomous driving. Some commonly used sensors include image sensors (e.g., infrared or visible light cameras), acoustic sensors (e.g., ultrasonic parking sensors), radio detection and ranging (RADAR) sensors, magnetometers (e.g., passive sensing of large ferrous objects, such as trucks, cars, or rail cars), and light detection and ranging (LiDAR) sensors.

A LiDAR system typically uses a light source and a light detection system to estimate distances to environmental features (e.g., pedestrians, vehicles, structures, plants, etc.). For example, a LiDAR system may transmit a light beam (e.g., a pulsed laser beam) to illuminate a target and then measure the time it takes for the transmitted light beam to arrive at the target and then return to a receiver near the transmitter or at a known location. In some LiDAR systems, the light beam emitted by the light source may be steered across a two-dimensional or three-dimensional region of interest according to a scanning pattern, to generate a "point cloud" that includes a collection of data points corresponding to target points in the region of interest. The data points in the point cloud may be dynamically and continuously updated, and may be used to estimate, for example, a distance, dimension, location, and speed of an object relative to the LiDAR system.

In a LiDAR system, one type of photodetector used is a silicon photomultiplier (SiPM), sometimes referred to as a Multi-Pixel Photon Counter (MPPC). A SiPM is a solid-state photodetector that in response to absorption of a photon can produce a current pulse several tens of nanoseconds long, with a gain is comparable to that of a photomultiplier tube (PMT). The SiPM is a solid state photomultiplier comprised of a high density matrix of Geiger-mode-operated avalanche photodiodes also known as SPAD (single-photon avalanche photodiode). These SPADs have high internal gain which enable single photon detection.

A drawback of a SiPM detector is that there is inter symbol interference (ISI) if two pulses are too close together. This is due to the nature of a SiPM detector, which has a fast rise time and slow RC decay tail. It would be desirable to reduce the ISI to enable detection of reflections off multiple close objects.

BRIEF SUMMARY OF THE INVENTION

Techniques disclosed herein relate generally to photodetector signal processing systems that can be used, for example, in light detection and ranging (LiDAR) systems or other light beam steering systems. More specifically, and without limitation, disclosed herein are apparatus and methods for reducing inter symbol interference from reflected laser pulses that are received close in time.

According to certain embodiments, a laser is provided to emit a laser beam pulse. A photodetector is mounted to receive a reflected laser beam pulse after reflecting off an object in an external environment, and produce a voltage signal corresponding to the reflected laser beam pulse. The voltage signal is provided to a delay path circuit having a delay line and a gain control circuit to provide a delayed, reduced amplitude voltage signal. The delayed, reduced amplitude voltage signal is subtracted from the voltage signal in a subtraction circuit. The output of the subtraction circuit is provided to a pulse detector circuit.

In one embodiment, the photodetector is a SiPM photodetector. The decay time of the SiPM voltage signal is exponential, corresponding to the RC time constant of the SiPM photodetector. Reducing the gain of an exponential signal linearly moves it down the slope of the trailing edge or decay slope, exactly matching the lower portion of the decay slope. Since the original and delayed signals have the same exponential decay, the smaller, delayed signal cancels out the slowly decaying trailing edge of the SiPM voltage signal. Thus, a sharp trailing edge is provided, that will drop below the decision (noise) threshold at an amount of time after the rising edge corresponding to the set delay of delay line. This will sufficiently eliminate the inter symbol interference with a subsequent pulse arriving after the delay time.

In certain embodiments, the voltage signal is an analog signal and the circuitry is analog. An analog delay line, analog gain control and analog amplifier, as the subtraction circuit, are used. Alternately, the photodetector output can be converted into a digital signal with an analog-to-digital converter, and the delay line, gain control and subtraction circuit can all be implemented in the digital domain.

In one embodiment, the delay path circuit has a delay line first, followed by the gain control circuit. In another embodiment, the delay path circuit has the gain control circuit first, followed by the delay line.

According to some embodiments, the photodetector is a silicon photomultiplier (SiPM) photodetector. In one embodiment, the pulse detector has a noise threshold to avoid detection of pulses below the noise threshold. In one embodiment, the noise threshold is between 5-200 millivolts. In one embodiment, the gain control circuit provides a gain of the voltage signal so that, upon subtraction of the reduced amplitude, delayed pulse, the resulting pulse decays to below the pulse detection threshold within an amount of time sufficient to allow detection of objects within the smallest distance for which the system is designed to operate. In one embodiment, the delay line is a Printed Circuit Board (PCB) Transmission Line (TL) or a delay line integrated circuit.

According to certain embodiments, a method for feed-forward equalization is provided. The method includes emitting laser beam pulses, and receiving a reflected laser beam pulse after reflecting off an object in an external environment. A voltage signal is produced by a photodetector corresponding to the reflected laser beam pulse. The voltage signal is delayed and reduced in amplitude to produce a reduced amplitude delayed voltage signal corresponding to the reflected laser beam pulse. The reduced amplitude delayed voltage signal corresponding to the reflected laser beam pulse is subtracted from the voltage signal corresponding to the reflected laser beam pulse to produce a truncated pulse signal. The arrival time of the leading edge of the truncated pulse signal is then detected.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

The features of the various embodiments described above, as well as other features and advantages of certain embodiments of the present invention, will be more apparent from the following detailed description taken in conjunction with the accompanying drawings, in which.

DETAILED DESCRIPTION OF THE INVENTION

Aspects of the present disclosure relate generally to bandpass optical filter systems that can be used, for example, in light detection and ranging (LiDAR) systems or other light beam detection systems. More specifically, disclosed herein are apparatus and methods for reducing inter symbol interference from reflected laser pulses that are received close in time.

In the following description, various examples of a feed-forward equalization circuit are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

The use of a SiPM detector provides a quick response time that allows detecting the arrival time of a laser pulse very accurately from a fast rising edge of the output signal from the SiPM photodetector. However, a SiPM photodetector has a slow RC decay tail which can overlap with a subsequent, quickly arriving pulse, generating inter symbol interference (ISI). Embodiments of the present invention provide an apparatus and method to truncate the trailing edge of the SiPM voltage signal so that it quickly falls below a noise threshold, allowing detection of a quickly arriving subsequent pulse. In embodiments, the truncated voltage signal is 5-10 nanoseconds (ns) in duration.

The following high level summary is intended to provide a basic understanding of some of the novel innovations depicted in the figures and presented in the corresponding descriptions provided below. Techniques disclosed herein relate generally to a circuit for splitting a SiPM voltage signal 418, and delaying and reducing the amplitude of one split to produce a delayed, reduced amplitude voltage signal 416 as illustrated in FIG. 4. The delayed, reduced amplitude voltage signal is then subtracted from the SiPM voltage signal to produce a truncated pulse 420. The decay time of the SiPM voltage signal is exponential, corresponding to the RC time constant of the SiPM photodetector. Reducing the gain of an exponential signal linearly moves it down the slope of the trailing edge or decay slope, exactly matching the lower portion of the decay slope. Since the signals have the same exponential decay, the smaller, delayed signal cancels out the slowly decaying trailing edge of the SiPM voltage signal 418. Thus, a sharp trailing edge is provided, that will drop below the decision (noise) threshold 302 of FIG. 3 at an amount of time after the rising edge corresponding to the set delay of delay line 404. This will sufficiently eliminate the inter symbol interference of voltage signal 418 with a subsequent pulse arriving after the delay time.

Figure 6:
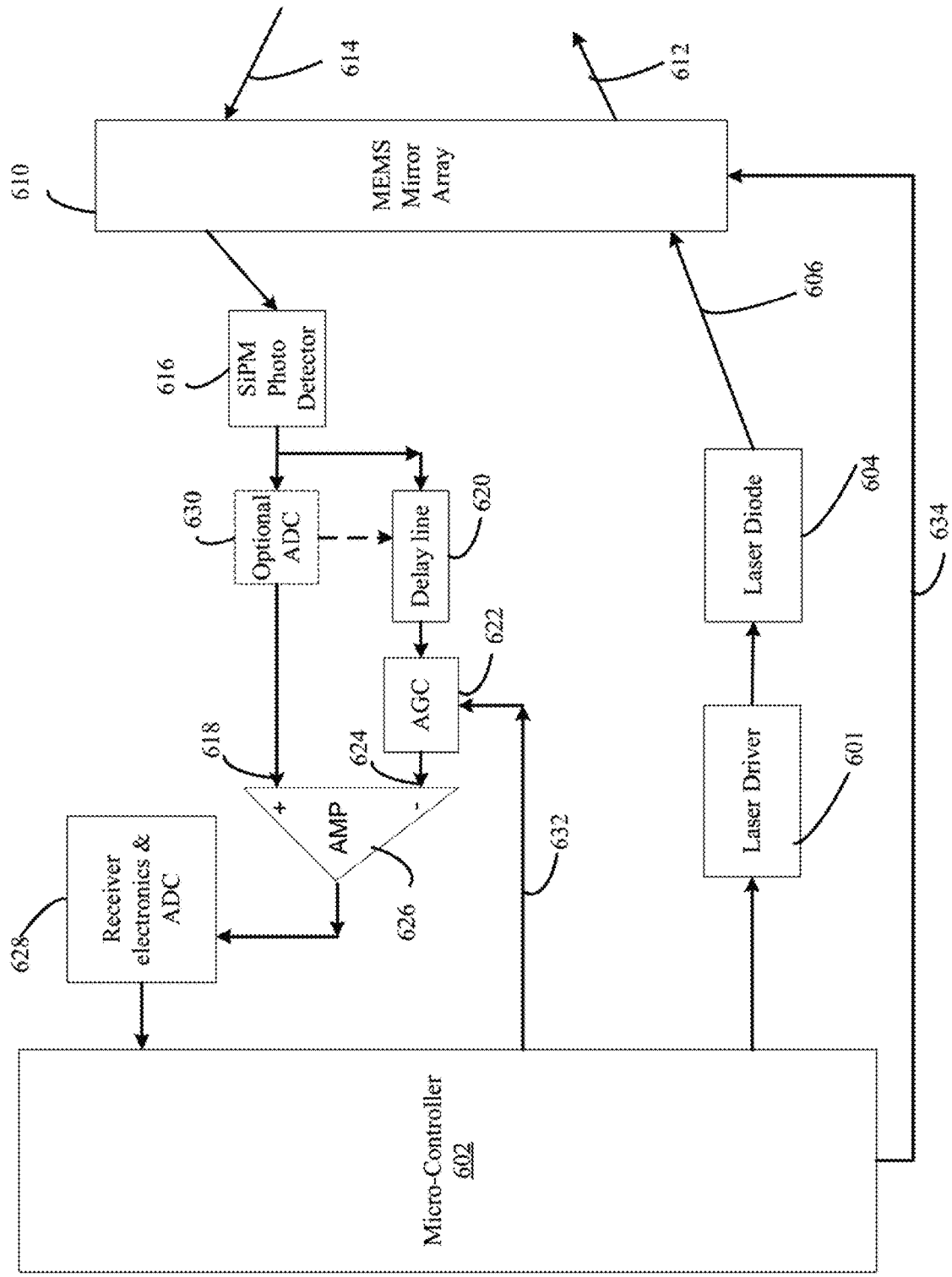
FIG. 6 is a diagram illustrating a LiDAR system including the feed-forward equalization circuit of FIG. 4, according to an embodiment.

More specifically, and without limitation, disclosed herein, as illustrated in FIG. 6, is a system with a laser diode 604 emitting laser beam pulses. A SiPM photodetector 616 is mounted to receive a reflected laser beam pulse after reflecting off an object in an external environment, and produce a voltage signal corresponding to the reflected laser beam pulse. A delay path circuit has an input coupled to an output of the photodetector, for producing a reduced amplitude delayed voltage signal corresponding to the reflected laser beam pulse. The delay path circuit includes a delay line 620 and a gain control circuit 622. A subtraction circuit 626 has a first input coupled to the output of the photodetector and a second input coupled to an output of the delay path circuit, for subtracting the reduced amplitude delayed voltage signal corresponding to the reflected laser beam pulse from the voltage signal corresponding to the reflected laser beam pulse. A pulse detector circuit 602 is coupled to the output of the subtraction circuit.

The system of these embodiments will improve the accuracy of detecting objects with a LiDAR system, where the reflected laser beam pulses may reflect off several close objects, arriving at a very short spacing that would cause inter symbol interference absent this invention. The following section describes such a LiDAR system into which embodiments of the present invention can be imbedded.

Typical Lidar System Environment for Certain Embodiments of the Invention

Figure 1:
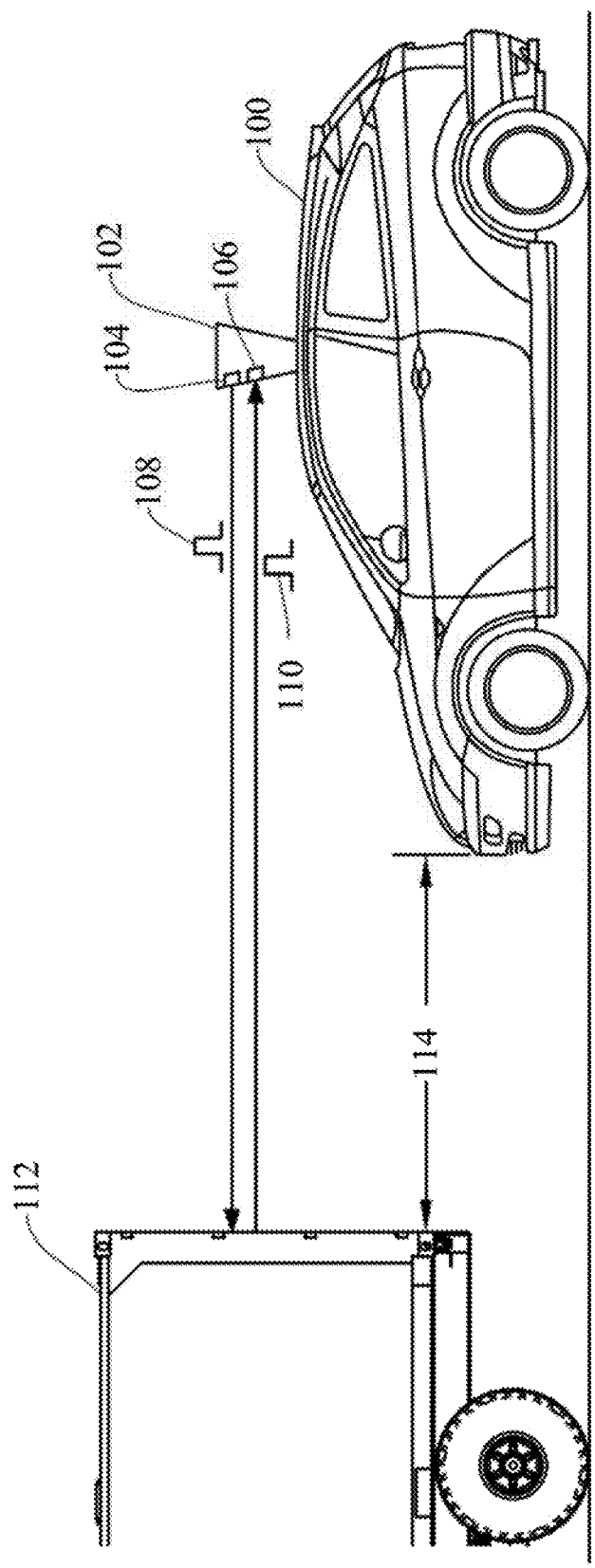
FIG. 1 shows an autonomous vehicle with a LiDAR system, according to certain embodiments.

FIG. 1 illustrates an autonomous vehicle 100 in which the various embodiments described herein can be implemented. Autonomous vehicle 100 can include a LiDAR module 102. LiDAR module 102 allows autonomous vehicle 100 to perform object detection and ranging in a surrounding environment. Based on the result of object detection and ranging, autonomous vehicle 100 can drive according to the rules of the road and maneuver to avoid a collision with detected objects. LiDAR module 102 can include a light steering transmitter 104 and a receiver 106. Light steering transmitter 104 can project one or more light signals 108 at various directions (e.g., incident angles) at different times in any suitable scanning pattern, while receiver 106 can monitor for a light signal 110 which is generated by the reflection of light signal 108 by an object. Light signals 108 and 110 may include, for example, a light pulse, an amplitude modulated continuous wave (AMCW) signal, etc. LiDAR module 102 can detect the object based on the reception of light signal 110, and can perform a ranging determination (e.g., a distance of the object) based on a time difference between light signals 108 and 110, as would be appreciated by one of ordinary skill in the art with the benefit of this disclosure. For example, as shown in FIG. 1, LiDAR module 102 can transmit light signal 108 at a direction directly in front of autonomous vehicle 100 at time T1 and receive light signal 110 reflected by an object 112 (e.g., another vehicle) at time T2. Based on the reception of light signal 110, LiDAR module 102 can determine that object 112 is directly in front of autonomous vehicle 100. Moreover, based on the time difference between T1 and T2, LiDAR module 102 can also determine a distance 114 between autonomous vehicle 100 and object 112. Autonomous vehicle 100 can thereby adjust its speed (e.g., slowing or stopping) to avoid collision with object 112 based on the detection and ranging of object 112 by LiDAR module 102.

Figure 2A:
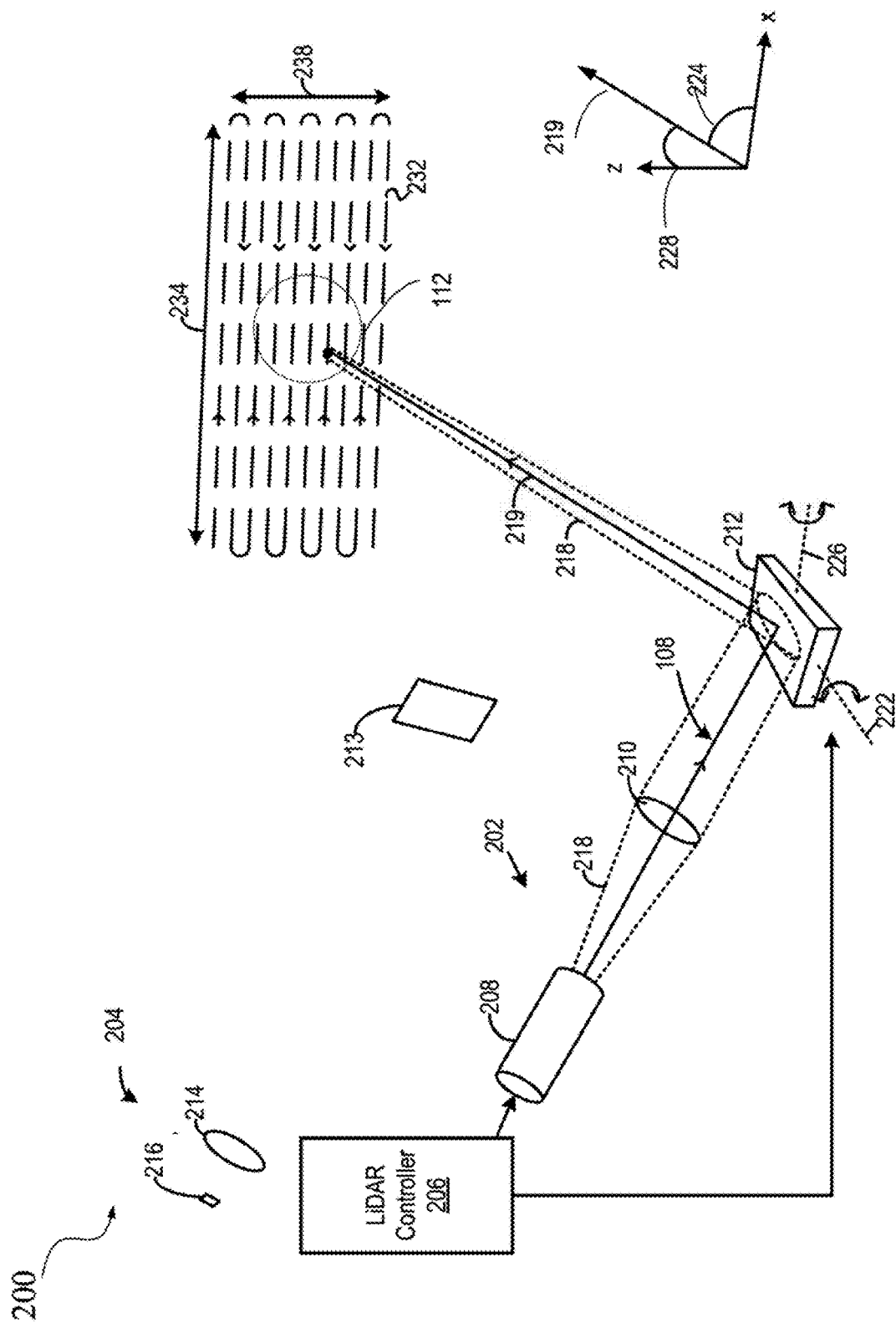
FIG. 2A shows an example of a light projection operation, according to certain embodiments.
Figure 2B:
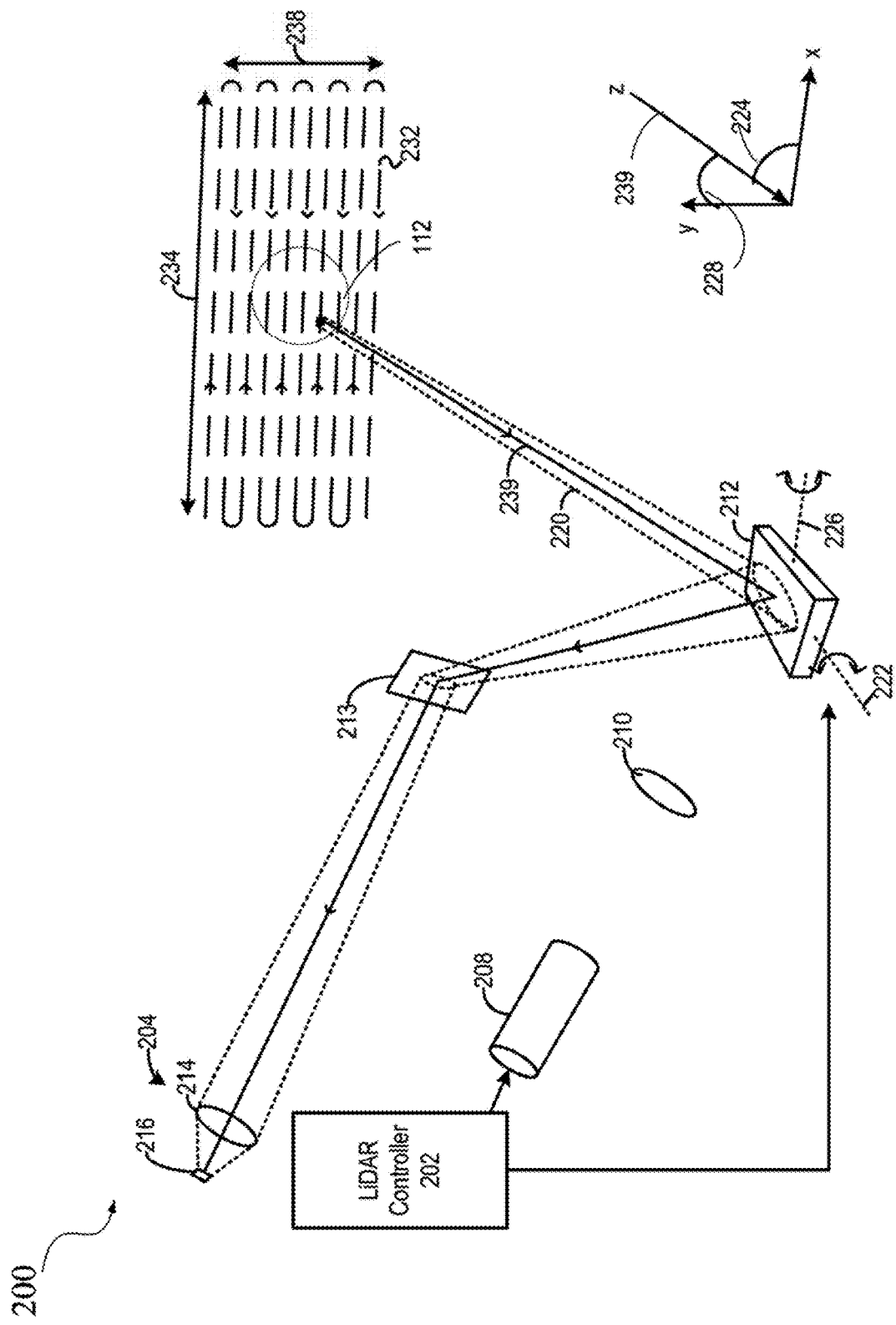
FIG. 2B shows an example of a light detection operation, according to certain embodiments.

FIG. 2A and FIG. 2B illustrate simplified block diagrams of an example of a LiDAR module 200 according to certain embodiments. LiDAR module 200 may be an example of LiDAR system 102, and may include a transmitter 202, a receiver 204, and LiDAR controller 206, which may be configured to control the operations of transmitter 202 and receiver 204. Transmitter 202 may include a light source 208 and a collimator lens 210, and receiver 204 can include a lens 214 and a photodetector 216. LiDAR module 200 may further include a mirror assembly 212 (also referred to as a "mirror structure") and a beam splitter 213. In some embodiments, LiDAR module 102, transmitter 202 and receiver 204 can be configured as a coaxial system to share mirror assembly 212 to perform light steering operations, with beam splitter 213 configured to reflect incident light reflected by mirror assembly 212 to receiver 204.

FIG. 2A shows an example of a light projection operation, according to certain embodiments. To project light, LiDAR controller 206 can control light source 208 (e.g., a pulsed laser diode, a source of FMCW signal, AMCW signal, etc.) to transmit light signal 108 as part of light beam 218. Light beam 218 can disperse upon leaving light source 208 and can be converted into collimated light beam 218 by collimator lens 210. Collimated light beam 218 can be incident upon a mirror assembly 212, which can reflect collimated light beam 218 to steer it along an output projection path 219 towards object 112. Mirror assembly 212 can include one or more rotatable mirrors. FIG. 2A illustrates mirror assembly 212 as having one mirror; however, a micro-mirror array may include multiple micro-mirror assemblies that can collectively provide the steering capability described herein. Mirror assembly 212 can further include one or more actuators (not shown in FIG. 2A) to rotate the rotatable mirrors. The actuators can rotate the rotatable mirrors around a first axis 222, and can rotate the rotatable mirrors along a second axis 226. The rotation around first axis 222 can change a first angle 224 of output projection path 219 with respect to a first dimension (e.g., the x-axis), whereas the rotation around second axis 226 can change a second angle 228 of output projection path 219 with respect to a second dimension (e.g., the z-axis). LiDAR controller 206 can control the actuators to produce different combinations of angles of rotation around first axis 222 and second axis 226 such that the movement of output projection path 219 can follow a scanning pattern 232. A range 234 of movement of output projection path 219 along the x-axis, as well as a range 238 of movement of output projection path 219 along the z-axis, can define a FOV. An object within the FOV, such as object 112, can receive and reflect collimated light beam 218 to form reflected light signal, which can be received by receiver 204 and detected by the LiDAR module, as further described below with respect to FIG. 2B. In certain embodiments, mirror assembly 212 can include one or more comb spines with comb electrodes (see, e.g., FIG. 3), as will be described in further detail below.

FIG. 2B shows an example of a light detection operation, according to certain embodiments. LiDAR controller 206 can select an incident light direction 239 for detection of incident light by receiver 204. The selection can be based on setting the angles of rotation of the rotatable mirrors of mirror assembly 212, such that only light beam 220 propagating along light direction 239 gets reflected to beam splitter 213, which can then divert light beam 220 to photodetector 216 via collimator lens 214. With such arrangements, receiver 204 can selectively receive signals that are relevant for the ranging/imaging of object 112 (or any other object within the FOV), such as light signal 110 generated by the reflection of collimated light beam 218 by object 112, and not to receive other signals. As a result, the effect of environmental disturbance on the ranging and imaging of the object can be reduced, and the system performance may be improved.

Feed-Forward Equalization System

Figure 3:
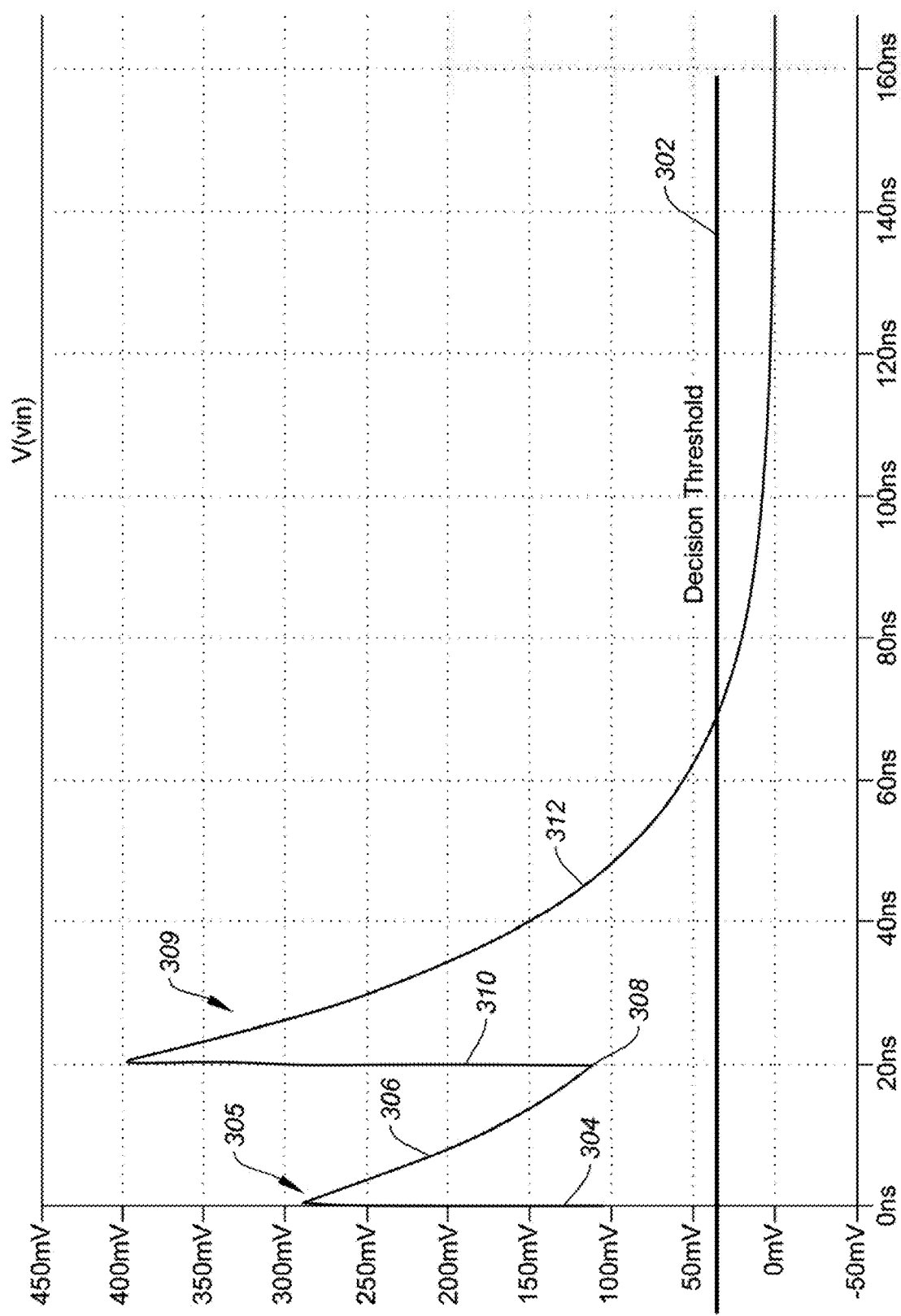
FIG. 3 is a diagram illustrating Inter Symbol Interference (ISI) for two received laser pulses close in proximity.
Figure 4:
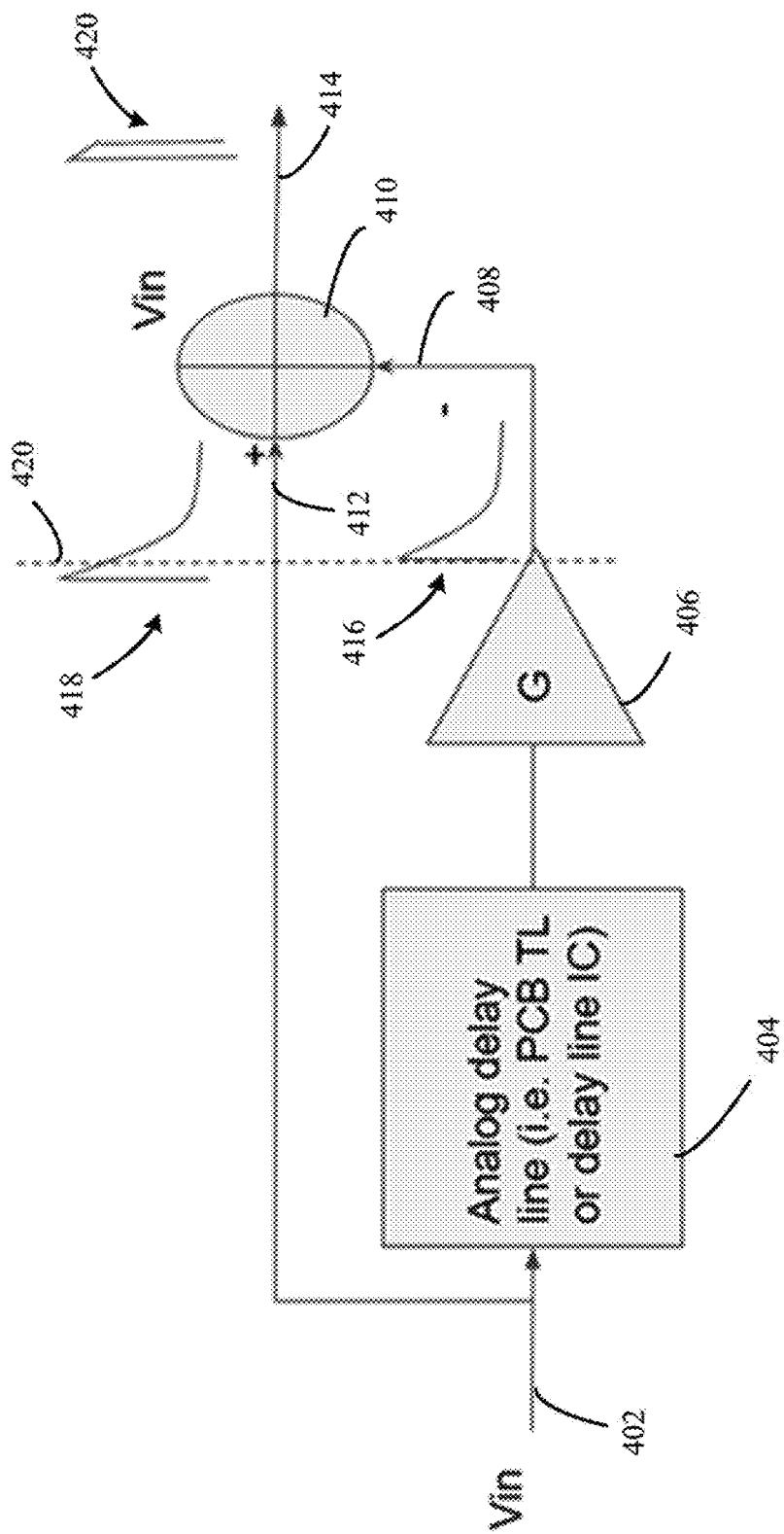
FIG. 4 is a diagram illustrating a feed-forward equalization circuit according to an embodiment.

FIG. 3 is a diagram illustrating Inter Symbol Interference (ISI) for two received laser pulses close in proximity. A decision or noise threshold level 302 of 40 mV is shown. This is the threshold for a pulse detector to avoid detecting noise as pulse signals. The noise rms value is expected to be less than one third of the threshold level (e.g. 10 mV) in this embodiment. The rising edge 304 of a first SiPM photodetector voltage signal 305 is shown, corresponding to a laser pulse detected by a SiPM photodetector. As can be seen, the rising edge is nearly vertical, due to the rapid response time of a SiPM photodetector. However, the trailing edge 306 of the voltage signal 305, the tail, trails off slowly, decaying in value. This is also a characteristic of a SiPM photodetector. The slope of trailing edge 306 corresponds to the RC time constant of the SiPM photodetector.

At a point 308, trailing edge 306 stops decaying because a new pulse voltage signal 309 has been detected, and a new rising edge 310 is shown. As can be seen, point 308 is above threshold 302, and thus there has been no indication of the end of the first pulse to the pulse detector. For the pulse detector, this second pulse appears to be part of the first pulse, and is not separately detected. The trailing edge 312 of the second pulse voltage signal eventually drops below decision threshold 302, triggering the pulse detector to detect a single pulse. Thus, the trailing edge of the first pulse voltage signal interferes with the detection of the second pulse.

FIG. 4 is a diagram illustrating a feed-forward equalization circuit according to an embodiment. An input voltage signal from a photodetector is provided on line 420. The input voltage line is split, with one branch going to an input of an analog delay line 404. In one embodiment, the delay line is a Printed Circuit Board (PCB) Transmission Line (TL) or a delay line integrated circuit. The output of analog delay line 404 is a delayed voltage signal. An output of the analog delay line 404 is provided to a gain circuit 406, to produce a reduced amplitude, delayed voltage signal. The output of gain circuit 406 is provided to a negative input 408 of a subtraction circuit 410. Subtraction circuit 410 is an analog amplifier in one embodiment. The other, positive input 412 of subtraction circuit 410 is connected directly to input line 402.

The output of gain circuit 406 is a reduced amplitude, delayed voltage signal 416. As can be seen, this signal is smaller than, and delayed from, a voltage signal 418 from input 402. Line 420 represents the amount of delay from the rising edge of voltage signal 418. Upon subtraction of signal 416 from signal 418 in subtraction circuit 410, a pulse signal 420 on line 414 is provided. The output signal of the SiPM photodetector has a very rapid rise time, allowing fast detection, but a relatively slow decay time. The decay time is exponential, corresponding to the RC time constant of the SiPM photodetector. A typical decay time is 10-30 ns, depending on the size of the photodetector and its fill factor (the percentage of the SiPM sensor surface area that is sensitive to light). Reducing the gain of an exponential signal linearly moves it down the slope, in theory exactly matching the lower portion of the decay slope. In practice, while not exact, it is close enough to cancel out the signal enough to bring it significantly below the noise threshold. Since signals 416 and 418 have the same exponential decay, the smaller signal 416 cancels out the slowly decaying trailing edge of signal 418. Thus, a sharp trailing edge is provided, that will drop below the decision (noise) threshold 302 of FIG. 3 at an amount of time after the rising edge corresponding to the set delay of delay line 404. This will sufficiently eliminate the inter symbol interference of voltage signal 418 with a subsequent pulse arriving after the delay time.

The gain circuit and subtracting amplifier will have bandwidth limitations. In one embodiment, both are designed to handle bandwidths up to 2 GHz, or any other bandwidth appropriate for the design. Since both the delay element and summing amplifier have bandwidth limitations, the output waveform will be filtered. But as long as the circuit's time-constant is sufficiently smaller than the incoming wave's tail time constant, the pulse can be equalized. For a 2 GHz bandwidth, the circuit's time constant is about 0.08 nanoseconds (ns), as the time constant is $1/(2pi*f)$, which is more than fast enough for detecting pulses in a range of 5-10 nanoseconds.

In one embodiment, the noise or decision threshold is set to be higher than the anticipated noise, but low enough to detect reduced amplitude pulses from the far end of the range of the system. In one embodiment, the delay is set somewhere between 5-10 ns, or alternately somewhere between 3-20 ns. For a LiDAR system, unlike communications, the goal is to detect the Time-Of-Flight (ToF), not a data pulse width. Thus, only the rising edge of the pulse needs to be detected in one embodiment, plus the fact that the pulse has ended. Thus, the trailing edge can be truncated as much as needed, so long as the rising edge can still be detected. Alternately, the truncated trailing edge can be detected, either alone or in combination with the rising edge. In some cases, the falling edge timing can be leveraged to improve the detected ToF accuracy.

Figure 5A:
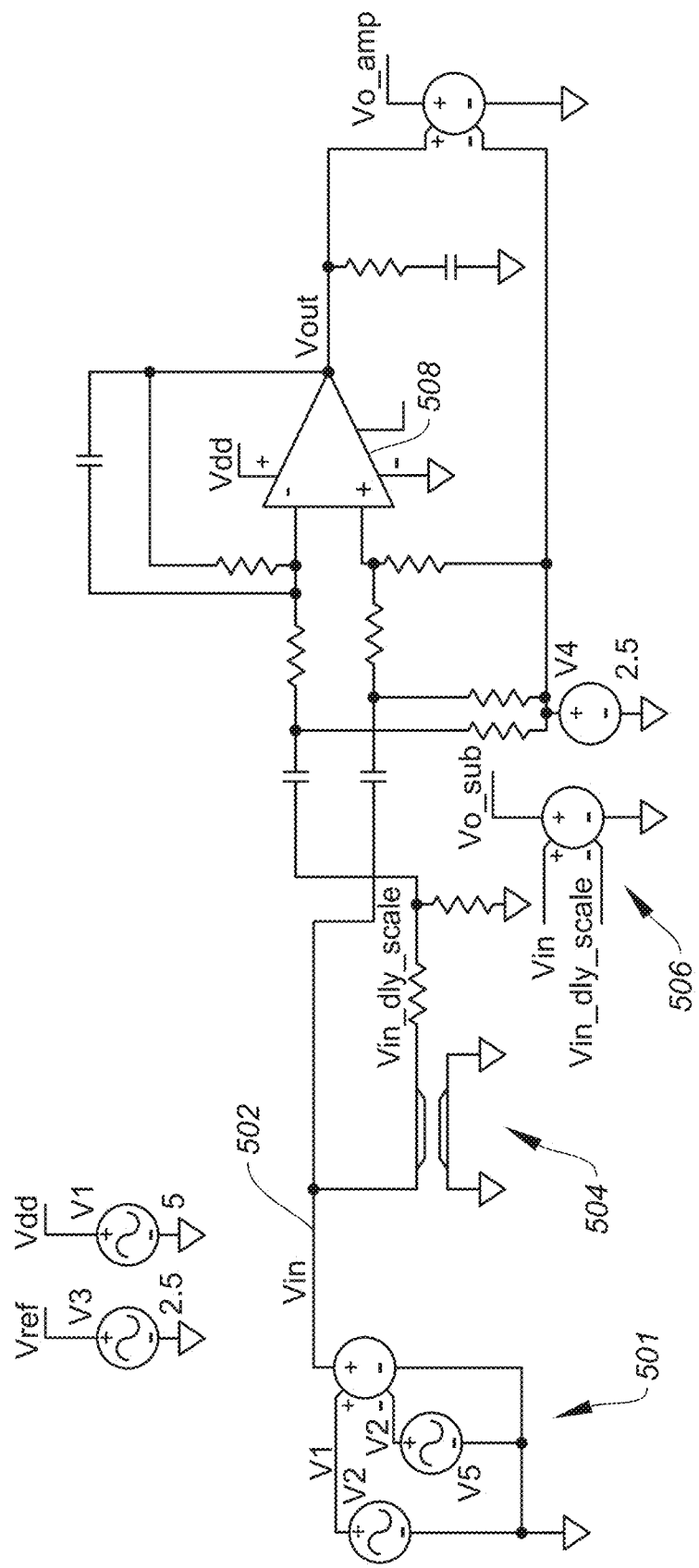
FIG. 5A is a circuit diagram of the feed-forward equalization circuit of FIG. 4 according to an embodiment.

FIG. 5A is a circuit diagram of the feed-forward equalization circuit of FIG. 4 according to an embodiment. The input voltage signal from a photodetector is provided on input line 502. Here, the photodetector input is simulated with a circuit 501. The input voltage line is split, with one branch going to an input of an analog delay line 504. The output of analog delay line 504 is provided to a gain circuit 506, to produce a reduced amplitude, delayed voltage signal. The output of gain circuit 506 is provided to a negative input of a subtraction circuit 508, which is an analog amplifier. The other, positive input of subtraction circuit 508 is connected directly to input line 502.

Figure 5B:
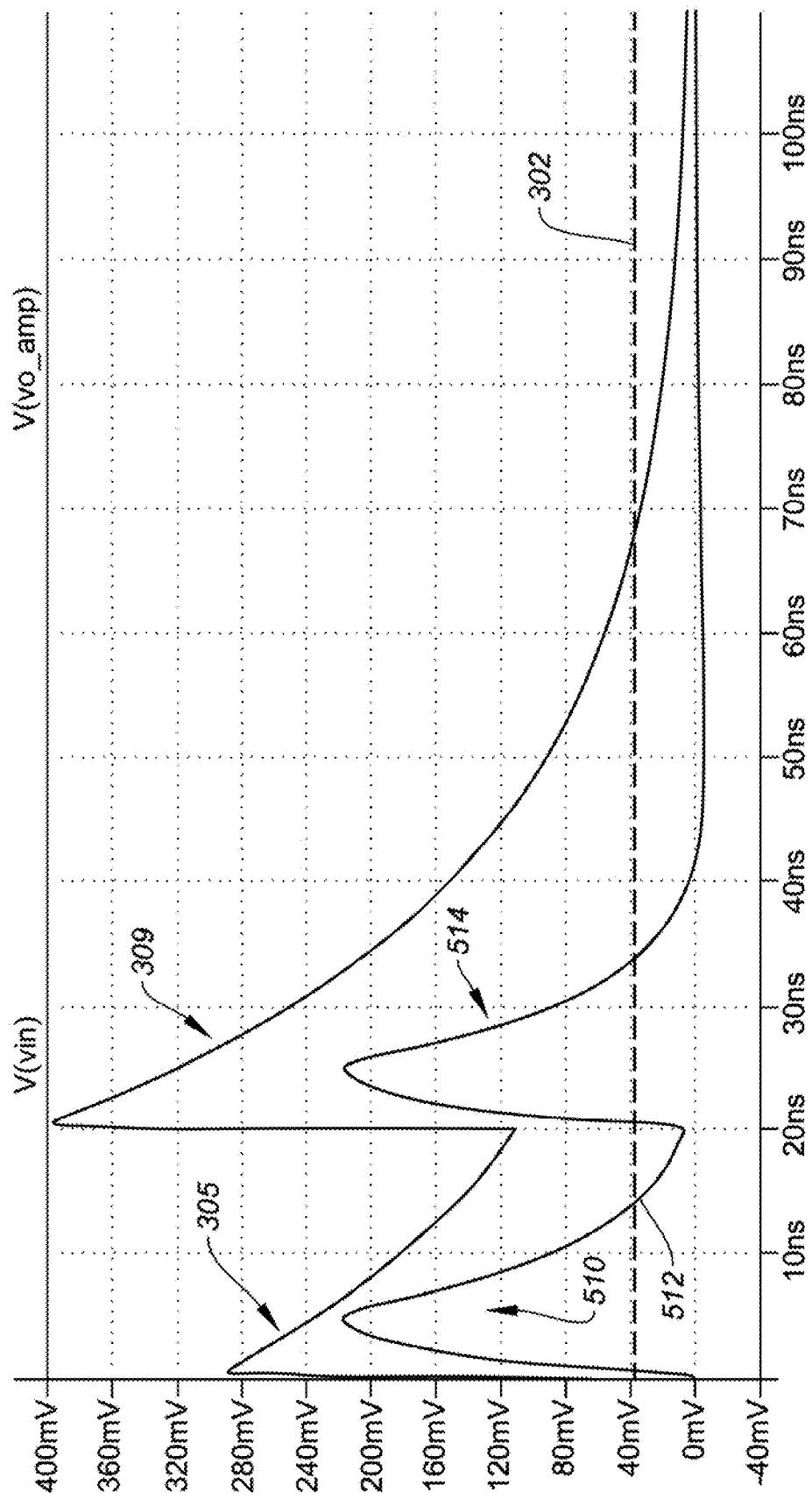
FIG. 5B is a diagram illustrating the output signals for two pulses of the circuit of FIG. 5A compared to the two pulse signals without delay of FIG. 3, according to an embodiment.

FIG. 5B is a diagram illustrating the output signals for two pulses of the circuit of FIG. 5A compared to the two pulse signals without delay of FIG. 3, according to an embodiment. As can be seen, the trailing edge of pulse voltage signal 305 does not drop below threshold 302 before a second pulse voltage signal 309 appears. However, a pulse voltage signal 510, after passing through the subtracting circuit of FIG. 4, drops below threshold 302 at a point 512, before a second pulse voltage signal 514 appears. Thus, second pulse voltage signal 514 can be separately detected. As can be seen, the initial pulse of over 200 mV decays to under the 40 mV threshold in about 15 ns.

FIG. 6 is a diagram illustrating a LiDAR system including the feed-forward equalization circuit of FIG. 4, according to an embodiment. As shown, a microcontroller 602 controls a laser driver 601 and laser diode 604 which provides a laser beam 606 to a MEMS mirror array 610. MEMS mirror array 610 scans an output laser beam 612 to provide raster scanning of the environment to be detected, as described above with respect to FIGS. 2A-B. The reflected beams 614 are provided to the same MEMS array 610, or a different MEMS mirror array, and then are directed to a SiPM photodetector 616.

A voltage signal output of SiPM photodetector 616 is provided directly to a positive input of a subtraction circuit, here an amplifier 626. The output of SiPM photodetector 616 is also provided to a delay line 620 and an Automatic Gain Control (AGC) circuit 622, then to the negative input of amplifier 626. Amplifier 626 provides the output signal, after subtraction, to receiver electronics and Analog-to-Digital Converter (ADC) 628. ADC 628 provides the digitized and processed output to micro-controller 602. Alternately, ADC 628 can be any Time-to-Digital Converter (TDC).

In an alternate embodiment, the output of SiPM photodetector 616 is first digitized in an ADC 630. The subsequent processing is then done in the digital domain, with a digital delay, digital gain and digital subtraction. This can be done with separate dedicated digital circuitry, or can be done in micro-controller 602 under program control.

Micro-controller 602 controls the gain of AGC 622 on a control line 632. Gain control circuit is controlled to provide a gain of the voltage signal in one embodiment. The gain is set so that, upon subtraction of the reduced amplitude, delayed pulse, the resulting pulse decays to below the pulse detection threshold within an amount of time sufficient to allow detection of objects within the smallest distance for which the system is designed to operate. In one embodiment, the system is expected to discriminate between pulses that are separated by as little as 5 ns, with a minimum amplitude of 15 mV, and a pulse detection threshold of 10 mV.

Figure 7:
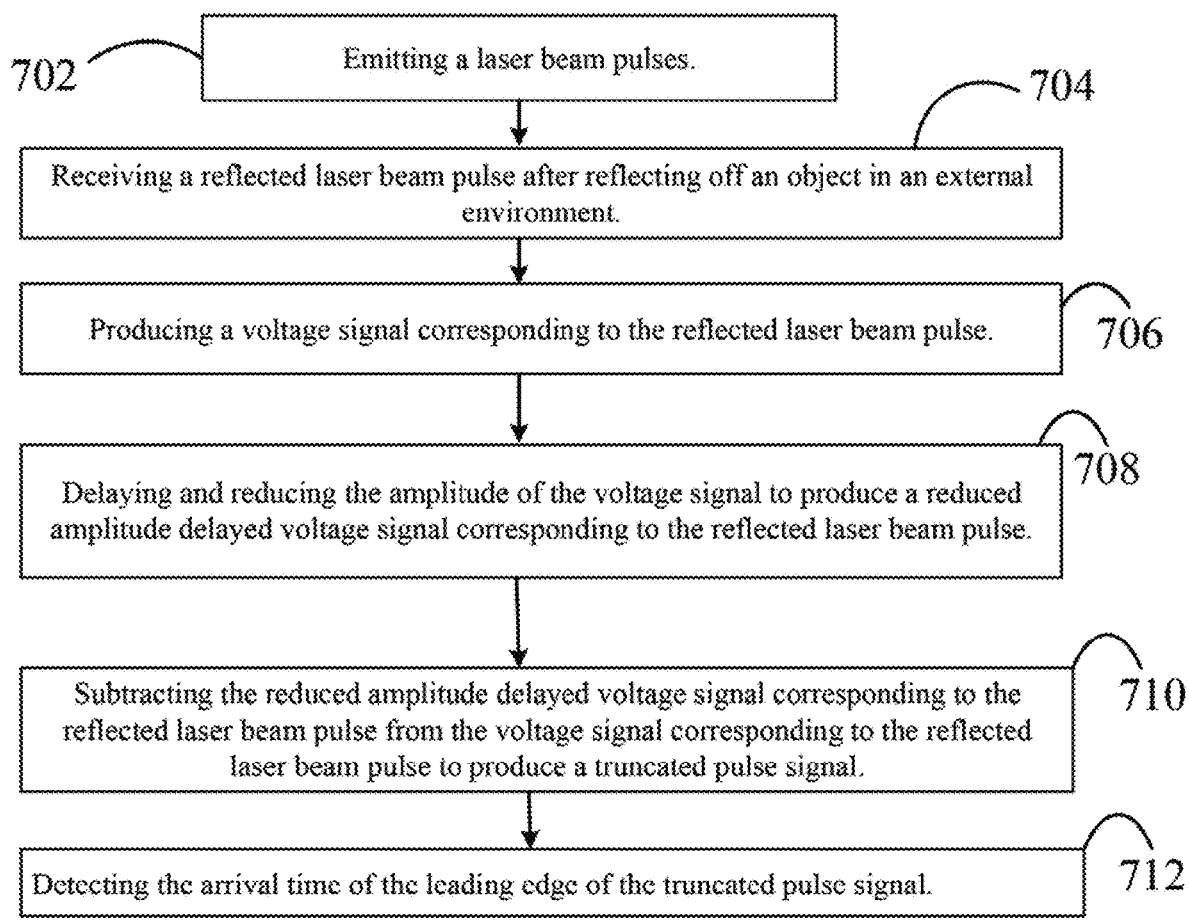
FIG. 7 is a flow chart of a method for feed-forward equalization, according to an embodiment.

FIG. 7 is a flow chart of a method for feed-forward equalization, according to an embodiment. The method includes emitting laser beam pulses (step 702). Step 704 is receiving a reflected laser beam pulse after reflecting off an object in an external environment. Step 706 is producing a voltage signal corresponding to the reflected laser beam pulse. Step 708 is delaying and reducing the amplitude of the voltage signal to produce a reduced amplitude delayed voltage signal corresponding to the reflected laser beam pulse. Step 710 is subtracting the reduced amplitude delayed voltage signal corresponding to the reflected laser beam pulse from the voltage signal corresponding to the reflected laser beam pulse to produce a truncated pulse signal. Step 712 is detecting the arrival time of the leading edge of the truncated pulse signal.

In summary, embodiments provide an apparatus for detecting a reflected laser beam in a Light Detection and Ranging (LiDAR) system 102 of an autonomous vehicle 100. A laser diode 604 emitting laser beam pulses is provided. A SiPM photodetector 616 is mounted to receive a reflected laser beam pulse after reflecting off an object in an external environment, and produce a voltage signal corresponding to the reflected laser beam pulse. A delay path circuit has an input coupled to an output of the SiPM photodetector, for producing a reduced amplitude delayed voltage signal corresponding to the reflected laser beam pulse. The delay path circuit includes a delay line 620 and a gain control circuit 622. A subtraction circuit 626 has a first input coupled to the output of the SiPM photodetector and a second input coupled to an output of the delay path circuit, for subtracting the reduced amplitude delayed voltage signal corresponding to the reflected laser beam pulse from the voltage signal corresponding to the reflected laser beam pulse. A pulse detector circuit 602 is coupled to the output of the subtraction circuit.

Example LiDAR System Implementing Aspects of Embodiments Herein

Figure 8:
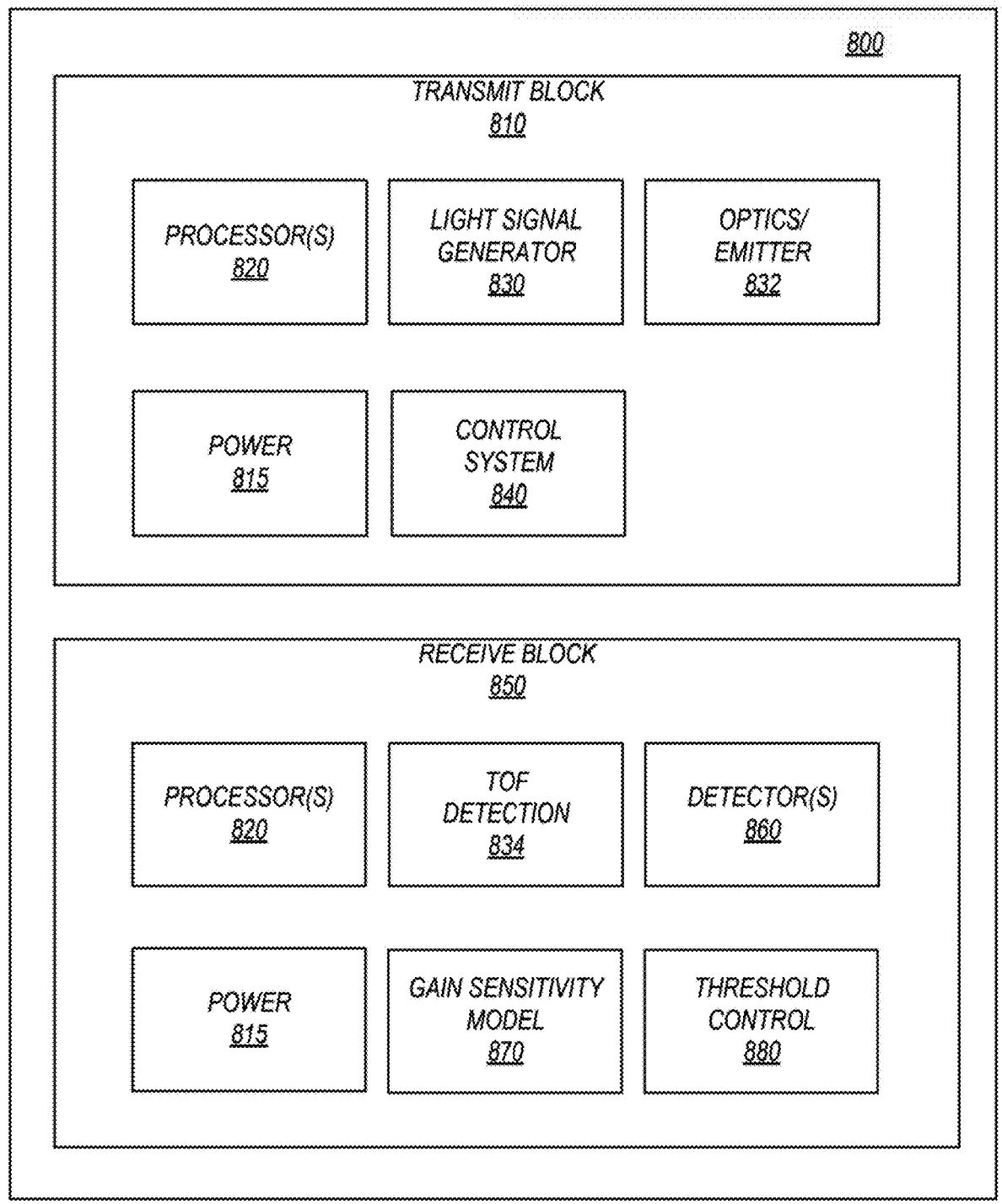
FIG. 8 illustrates a simplified block diagram showing aspects of a LiDAR-based detection system, according to certain embodiments of the invention.

FIG. 8 illustrates a simplified block diagram showing aspects of a LiDAR-based detection system 800 incorporating the feed-forward equalization system described above, according to certain embodiments. System 800 may be configured to transmit, detect, and process LiDAR signals to perform object detection as described above with regard to LiDAR system 100 described in FIG. 1. In general, a LiDAR system 800 includes one or more transmitters (e.g., transmit block 810) and one or more receivers (e.g., receive block 850). LiDAR system 800 may further include additional systems that are not shown or described to prevent obfuscation of the novel features described herein.

Transmit block 810, as described above, can incorporate a number of systems that facilitate that generation and emission of a light signal, including dispersion patterns (e.g., 360 degree planar detection), pulse shaping and frequency control, Time-Of-Flight (TOF) measurements, and any other control systems to enable the LiDAR system to emit pulses in the manner described above. In the simplified representation of FIG. 8, transmit block 810 can include processor(s) 820, light signal generator 830, optics/emitter module 832, power block 815 and control system 840. Some of all of system blocks 820-840 can be in electrical communication with processor(s) 820.

In certain embodiments, processor(s) 820 may include one or more microprocessors (μCs) and can be configured to control the operation of system 800. Alternatively or additionally, processor 820 may include one or more microcontrollers (MCUs), digital signal processors (DSPs), or the like, with supporting hardware, firmware (e.g., memory, programmable I/Os, etc.), and/or software, as would be appreciated by one of ordinary skill in the art. Alternatively, MCUs, μCs, DSPs, ASIC, programmable logic device, and the like, may be configured in other system blocks of system 800. For example, control system block 840 may include a local processor to certain control parameters (e.g., operation of the emitter). Processor(s) 820 may control some or all aspects of transmit block 810 (e.g., optics/emitter 832, control system 840, dual sided mirror 220 position as shown in FIG. 1, position sensitive device 250, etc.), receive block 850 (e.g., processor(s) 820) or any aspects of LiDAR system 800. Processor(s) 820 also determine the gain of the feed-forward equalization circuit, and detect the arrival time of the digitized pulse in one embodiment. In some embodiments, multiple processors may enable increased performance characteristics in system 800 (e.g., speed and bandwidth), however multiple processors are not required, nor necessarily germane to the novelty of the embodiments described herein. Alternatively or additionally, certain aspects of processing can be performed by analog electronic design, as would be understood by one of ordinary skill in the art.

Light signal generator 830 may include circuitry (e.g., a laser diode) configured to generate a light signal, which can be used as the LiDAR send signal, according to certain embodiments. In some cases, light signal generator 830 may generate a laser that is used to generate a continuous or pulsed laser beam at any suitable electromagnetic wavelengths spanning the visible light spectrum and non-visible light spectrum (e.g., ultraviolet and infra-red). In some embodiments, lasers are commonly in the range of 600-1550 nm, although other wavelengths are possible, as would be appreciated by one of ordinary skill in the art.

Optics/Emitter block 832 (also referred to as transmitter 832) may include one or more arrays of mirrors (including but not limited to dual sided mirror 220 as described above in FIGS. 1-6) for redirecting and/or aiming the emitted laser pulse, mechanical structures to control spinning and/or moving of the emitter system, or other system to affect the system field-of-view, as would be appreciated by one of ordinary skill in the art with the benefit of this disclosure. For instance, some systems may incorporate a beam expander (e.g., convex lens system) in the emitter block that can help reduce beam divergence and increase the beam diameter. These improved performance characteristics may mitigate background return scatter that may add noise to the return signal. In some cases, optics/emitter block 832 may include a beam splitter to divert and sample a portion of the pulsed signal. For instance, the sampled signal may be used to initiate the TOF clock. In some cases, the sample can be used as a reference to compare with backscatter signals. Some embodiments may employ micro electromechanical mirrors (MEMS) that can reorient light to a target field. Alternatively or additionally, multi-phased arrays of lasers may be used. Any suitable system may be used to emit the LiDAR send pulses, as would be appreciated by one of ordinary skill in the art.

Power block 815 can be configured to generate power for transmit block 810, receive block 850, as well as manage power distribution, charging, power efficiency, and the like. In some embodiments, power management block 815 can include a battery (not shown), and a power grid within system 800 to provide power to each subsystem (e.g., control system 840, etc.). The functions provided by power management block 815 may be subsumed by other elements within transmit block 810, or may provide power to any system in LiDAR system 800. Alternatively, some embodiments may not include a dedicated power block and power may be supplied by a number of individual sources that may be independent of one another.

Control system 840 may control aspects of light signal generation (e.g., pulse shaping), optics/emitter control, TOF timing, or any other function described herein. In some cases, aspects of control system 840 may be subsumed by processor(s) 820, light signal generator 830, or any block within transmit block 810, or LiDAR system 800 in general.

Receive block 850 may include circuitry configured to detect and process a return light pulse to determine a distance of an object, and in some cases determine the dimensions of the object, the velocity and/or acceleration of the object, and the like. This block includes the feed-forward equalization system described above. Processor(s) 1065 may be configured to perform operations such as processing received return pulses from detectors(s) 860, controlling the operation of TOF module 834, controlling threshold control module 880, or any other aspect of the functions of receive block 850 or LiDAR system 800 in general. Processor(s) 1065 also control the mirror array in the tunable bandpass filter feedback system as described above.

TOF module 834 may include a counter for measuring the time-of-flight of a round trip for a send and return signal. In some cases, TOF module 834 may be subsumed by other modules in LiDAR system 800, such as control system 840, optics/emitter 832, or other entity. TOF modules 834 may implement return "windows" that limit a time that LiDAR system 800 looks for a particular pulse to be returned. For example, a return window may be limited to a maximum amount of time it would take a pulse to return from a maximum range location (e.g., 250 m). Some embodiments may incorporate a buffer time (e.g., maximum time plus 10%). TOF module 834 may operate independently or may be controlled by other system block, such as processor(s) 820, as described above. In some embodiments, transmit block may also include a TOF detection module. One of ordinary skill in the art with the benefit of this disclosure would appreciate the many modification, variations, and alternative ways of implementing the TOF detection block in system 800.

Detector(s) 860 may detect incoming return signals that have reflected off one or more objects, and can include SiPM photodetector 616 (which can also include gain sensitivity module 870 and threshold control 880, described below). In some cases, LiDAR system 800 may employ spectral filtering based on wavelength, polarization, and/or range to help reduce interference, filter unwanted frequencies, or other deleterious signals that may be detected. Typically, detector(s) 860 can detect an intensity of light and records data about the return signal (e.g., via coherent detection, photon counting, analog signal detection, or the like). Detector (s) 860 can use a SiPM photodetector or any suitable photodetector technology including solid state photodetectors (e.g., silicon avalanche photodiodes, complimentary metal-oxide semiconductors (CMOS), charge-coupled devices (CCD), hybrid CMOS/CCD devices) or photomultipliers. In some cases, a single receiver may be used or multiple receivers may be configured to operate in parallel.

Gain sensitivity model 870 may include systems and/or algorithms for determining a gain sensitivity profile that can be adapted to a particular object detection threshold. The gain sensitivity profile can be modified based on a distance (range value) of a detected object (e.g., based on TOF measurements). In some cases, the gain profile may cause an object detection threshold to change at a rate that is inversely proportional with respect to a magnitude of the object range value. A gain sensitivity profile may be generated by hardware/software/firmware, or gain sensor model 870 may employ one or more look up tables (e.g., stored in a local or remote database) that can associate a gain value with a particular detected distance or associate an appropriate mathematical relationship there between (e.g., apply a particular gain at a detected object distance that is 10% of a maximum range of the LiDAR system, apply a different gain at 15% of the maximum range, etc.). In some cases, a Lambertian model may be used to apply a gain sensitivity profile to an object detection threshold. The Lambertian model typically represents perfectly diffuse (matte) surfaces by a constant bidirectional reflectance distribution function (BRDF), which provides reliable results in LiDAR system as described herein. However, any suitable gain sensitivity profile can be used including, but not limited to, Oren-Nayar model, Nanrahan-Krueger, Cook-Torrence, Diffuse BRDF, Limmel-Seeliger, Blinn-Phong, Ward model, HTSG model, Fitted Lafortune Model, or the like. One of ordinary skill in the art with the benefit of this disclosure would understand the many alternatives, modifications, and applications thereof.

Threshold control block 880 may set an object detection threshold for LiDAR system 800. For example, threshold control block 880 may set an object detection threshold over a certain a full range of detection for LiDAR system 800. The object detection threshold may be determined based on a number of factors including, but not limited to, noise data (e.g., detected by one or more microphones) corresponding to an ambient noise level, and false positive data (typically a constant value) corresponding to a rate of false positive object detection occurrences for the LiDAR system. In some embodiments, the object detection threshold may be applied to the maximum range (furthest detectable distance) with the object detection threshold for distances ranging from the minimum detection range up to the maximum range being modified by a gain sensitivity model (e.g., Lambertian model).

Although certain systems may not expressly discussed, they should be considered as part of system 800, as would be understood by one of ordinary skill in the art. For example, system 800 may include a bus system (e.g., CAMBUS) to transfer power and/or data to and from the different systems therein. In some embodiments, system 800 may include a storage subsystem (not shown). A storage subsystem can store one or more software programs to be executed by processors (e.g., in processor(s) 820). It should be understood that "software" can refer to sequences of instructions that, when executed by processing unit(s) (e.g., processors, processing devices, etc.), cause system 800 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute in order to execute various operations (e.g., software-controlled spring auto-adjustment, etc.) as described herein. Some software controlled aspects of LiDAR system 800 may include aspects of gain sensitivity model 870, threshold control 880, control system 840, TOF module 834, or any other aspect of LiDAR system 800.

It should be appreciated that system 800 is meant to be illustrative and that many variations and modifications are possible, as would be appreciated by one of ordinary skill in the art. System 800 can include other functions or capabilities that are not specifically described here. For example, LiDAR system 800 may include a communications block (not shown) configured to enable communication between LiDAR system 800 and other systems of the vehicle or remote resource (e.g., remote servers), etc., according to certain embodiments. In such cases, the communications block can be configured to provide wireless connectivity in any suitable communication protocol (e.g., radio-frequency (RF), Bluetooth, BLE, infra-red (IR), ZigBee, Z-Wave, Wi-Fi, or a combination thereof).

While system 800 is described with reference to particular blocks (e.g., threshold control block 880), it is to be understood that these blocks are defined for understanding certain embodiments of the invention and is not intended to imply that embodiments are limited to a particular physical arrangement of component parts. The individual blocks need not correspond to physically distinct components. Blocks can be configured to perform various operations, e.g., by programming a processor or providing appropriate processes, and various blocks may or may not be reconfigurable depending on how the initial configuration is obtained. Certain embodiments can be realized in a variety of apparatuses including electronic devices implemented using any combination of circuitry and software. Furthermore, aspects and/or portions of system 800 may be combined with or operated by other sub-systems as informed by design. For example, power management block 815 and/or threshold control block 880 may be integrated with processor(s) 820 instead of functioning as separate entities.

Example Computer Systems Implementing Aspects of Embodiments Herein

Figure 9:
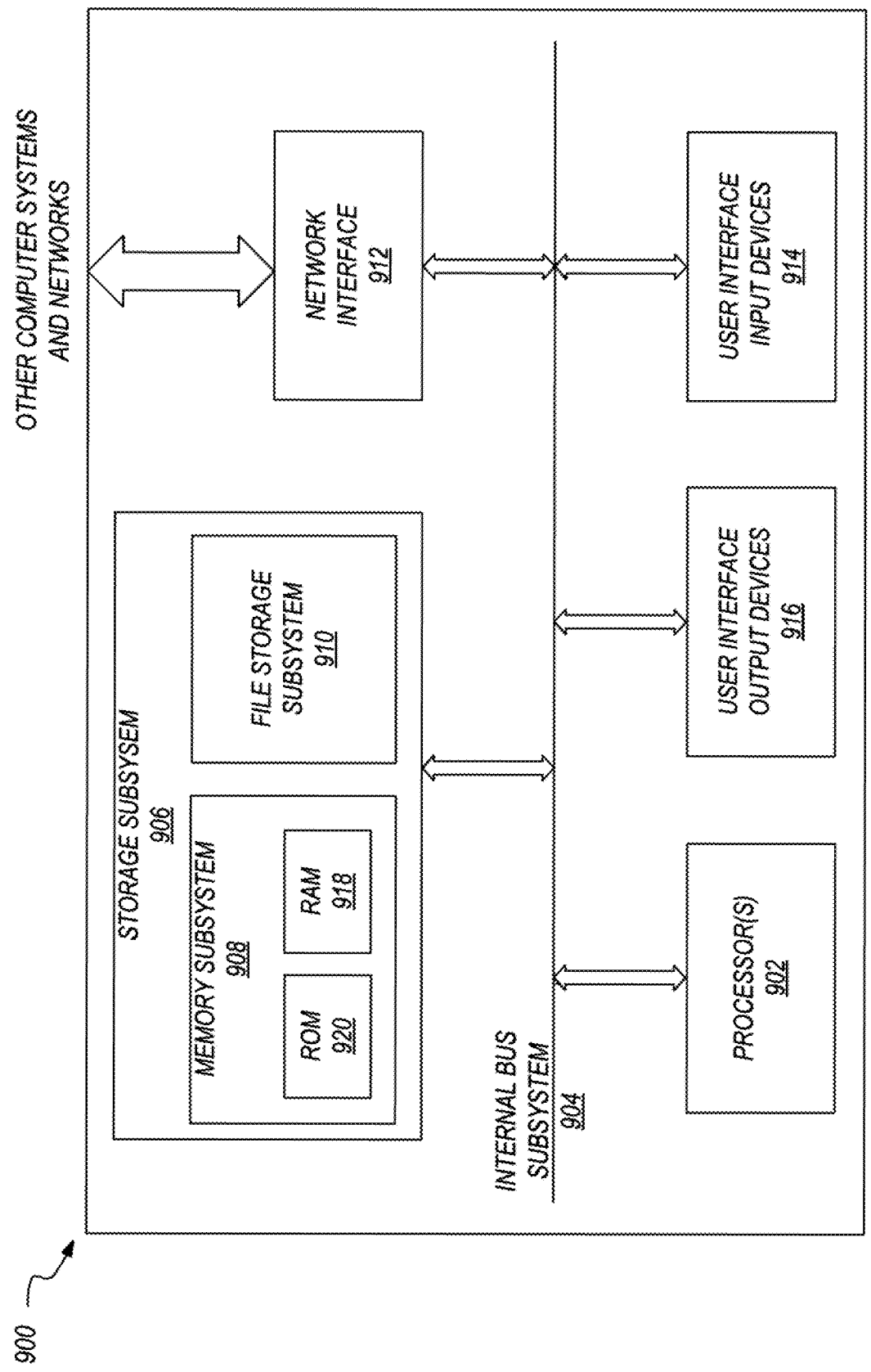
FIG. 9 illustrates an example computer system that may be utilized to implement techniques disclosed herein, according to certain embodiments of the invention.

FIG. 9 is a simplified block diagram of computer system 900 configured to operate aspects of a LiDAR-based detection system, according to certain embodiments. Computing system 900 can be used to implement any of the systems and modules discussed above with respect to FIGS. 1-6. For example, computing system 900 may operate aspects of threshold control 880, TOF module 834, processor(s) 820, control system 840, or any other element of LiDAR system 800 or other system described herein. Computing system 900 can include, for example, a field programmable gate array (FPGA), an application specific integrated circuit (ASIC), and a general purpose central processing unit (CPU), to implement the disclosed techniques, including the techniques described from FIG. 1-FIG. 7, such as microcontroller 602. In some examples, computing system 1100 can also can also include one or more processors 902 that can communicate with a number of peripheral devices (e.g., input devices) via a bus subsystem 904. These peripheral devices can include storage subsystem 906 (comprising memory subsystem 908 and file storage subsystem 910), user interface input devices 914, user interface output devices 916, and a network interface subsystem 912.

In some examples, internal bus subsystem 904 (e.g., CAMBUS) can provide a mechanism for letting the various components and subsystems of computer system 900 communicate with each other as intended. Although internal bus subsystem 904 is shown schematically as a single bus, alternative embodiments of the bus subsystem can utilize multiple buses. Additionally, network interface subsystem 912 can serve as an interface for communicating data between computing system 900 and other computer systems or networks. Embodiments of network interface subsystem 912 can include wired interfaces (e.g., Ethernet, CAN, RS232, RS485, etc.) or wireless interfaces (e.g., ZigBee, Wi-Fi, cellular, etc.).

In some cases, user interface input devices 914 can include a keyboard, pointing devices (e.g., mouse, trackball, touchpad, etc.), a barcode scanner, a touch-screen incorporated into a display, audio input devices (e.g., voice recognition systems, microphones, etc.), Human Machine Interfaces (HMI) and other types of input devices. In general, use of the term "input device" is intended to include all possible types of devices and mechanisms for inputting information into computing system 900. Additionally, user interface output devices 916 can include a display subsystem, a printer, or non-visual displays such as audio output devices, etc. The display subsystem can be any known type of display device. In general, use of the term "output device" is intended to include all possible types of devices and mechanisms for outputting information from computing system 900.

Storage subsystem 906 can include memory subsystem 908 and file/disk storage subsystem 910. Subsystems 908 and 910 represent non-transitory computer-readable storage media that can store program code and/or data that provide the functionality of embodiments of the present disclosure. In some embodiments, memory subsystem 908 can include a number of memories including main random access memory (RAM) 918 for storage of instructions and data during program execution and read-only memory (ROM) 920 in which fixed instructions may be stored. File storage subsystem 910 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art. The memory system can contain a look-up table providing the wavelength corresponding to a detected temperature of the laser diode.

It should be appreciated that computer system 900 is illustrative and not intended to limit embodiments of the present disclosure. Many other configurations having more or fewer components than computing system 900 are possible.

The various embodiments further can be implemented in a wide variety of operating environments, which in some cases can include one or more user computers, computing devices or processing devices, which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local-area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments. However, computer-readable storage media does not include transitory media such as carrier waves or the like.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims. For instance, any of the examples, alternative examples, etc., and the concepts thereof may be applied to any other examples described and/or within the spirit and scope of the disclosure.

For example, instead of using a single laser to illuminate the array of MEMS mirrors, an array of mirrors may be used. Also, the pattern generation and decoding could be hard-wired, in firmware or in software in different embodiments.

The feed-forward equalization structure of the present invention can be used in a variety of other applications than LIDAR. Light beam steering and detection techniques can also be used in other optical systems, such as optical display systems (e.g., TVs), optical sensing systems, optical imaging systems, and the like. In various light beam steering systems, the light beam may be steered by, for example, a rotating platform driven by a motor, a multi-dimensional mechanical stage, a Galvo-controlled mirror, a resonant fiber, an array of microelectromechanical (MEMS) mirrors, or any combination thereof. A MEMS micro-mirror may be rotated around a pivot or connection point by, for example, a micro-motor, an electromagnetic actuator, an electrostatic actuator, or a piezoelectric actuator.

The MEMS mirror structure of the present invention can have the mirror mass driven by different types of actuators. In some light steering systems, the transmitted or received light beam may be steered by an array of micro-mirrors. Each micro-mirror may rotate around a pivot or connection point to deflect light incident on the micro-mirror to desired directions. The performance of the micro-mirrors may directly affect the performance of the light steering system, such as the field of view (FOV), the quality of the point cloud, and the quality of the image generated using a light steering system. For example, to increase the detection range and the FOV of a LiDAR system, micro-mirrors with large rotation angles and large apertures may be used, which may cause an increase in the maximum displacement and the moment of inertia of the micro-mirrors. To achieve a high resolution, a device with a high resonant frequency may be used, which may be achieved using a rotating structure with a high stiffness. It may be difficult to achieve this desired performance using electrostatic actuated micro-mirrors because comb fingers used in an electrostatic-actuated micro-mirror may not be able to provide the force and moment needed and may disengage at large rotation angles, in particular, when the aperture of the micro-mirror is increased to improve the detection range. Some piezoelectric actuators may be used to achieve large displacements and large scanning angles due to their ability to provide a substantially larger drive force than electrostatic-actuated types, with a relatively lower voltage.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

What is claimed is:

1. An apparatus for detecting a reflected laser beam in a Light Detection and Ranging (LiDAR) system of an autonomous vehicle, the apparatus comprising:
   a laser diode configured to emit a laser beam pulse;
   a photodetector mounted to receive a reflected laser beam pulse after the laser beam pulse is reflected off an object in an external environment, and produce a voltage signal corresponding to the reflected laser beam pulse;
   a delay path circuit having an input coupled to an output of the photodetector, the delay path circuit configured to produce a reduced amplitude delayed voltage signal corresponding to the reflected laser beam pulse, the delay path circuit including:
      a delay line, and
      a gain control circuit; and
   a subtraction circuit having a first input coupled to the output of the photodetector and a second input coupled to an output of the delay path circuit, the subtraction circuit configured to subtract the reduced amplitude delayed voltage signal corresponding to the reflected laser beam pulse from the voltage signal corresponding to the reflected laser beam pulse.

2. The apparatus of claim 1 wherein the delay line is coupled to the output of the photodetector and the gain control circuit is coupled between the delay line and the subtraction circuit.

3. The apparatus of claim 1 wherein the voltage signal is an analog signal, and the delay line is an analog delay line.

4. The apparatus of claim 3 wherein the subtraction circuit is an analog amplifier.

5. The apparatus of claim 1 further comprising an analog to digital converter coupled to an output of the photodetector.

6. The apparatus of claim 1 wherein the photodetector is a silicon photomultiplier (SiPM) photodetector.

7. The apparatus of claim 1 wherein the delay line provides a delay of 2-20 nanoseconds.

8. The apparatus of claim 1 further comprising a pulse detector coupled to the output of the subtraction circuit.

9. The apparatus of claim 8 wherein pulse detector has a noise threshold to avoid detection of pulses below the noise threshold.

10. The apparatus of claim 9 wherein the noise threshold is between 5-200 millivolts.

11. The apparatus of claim 1 further comprising a pulse detector circuit coupled to the output of the subtraction circuit.

12. An apparatus for detecting a reflected laser beam, the apparatus comprising:
   a laser diode configured to emit a laser beam pulse;
   a silicon photomultiplier (SiPM) photodetector mounted to receive a reflected laser beam pulse after reflecting off an object in an external environment, and produce a voltage signal corresponding to the reflected laser beam pulse;
   a delay path circuit having an input coupled to an output of the SiPM photodetector, and an output that produces a reduced amplitude delayed voltage signal corresponding to the reflected laser beam pulse, the delay path circuit including:
      an analog delay line coupled to an output of the SiPM photodetector, configured to provide a delay between 5-20 nanoseconds, and
      an analog gain control circuit coupled to the output of the analog delay line;
   a subtraction circuit comprising an analog amplifier having a first input coupled to the output of the SiPM photodetector and a second input coupled to an output of the delay path circuit, the subtraction circuit configured to subtract the reduced amplitude delayed voltage signal corresponding to the reflected laser beam pulse from the voltage signal corresponding to the reflected laser beam pulse;
   an analog to digital converter coupled to an output of the subtraction circuit; and
   a microcontroller coupled to the output of the subtraction circuit and programmed to detect the reflected laser beam pulse.

13. A method comprising:
   emitting laser beam pulses;
   receiving a reflected laser beam pulse after reflecting off an object in an external environment;
   producing a voltage signal corresponding to the reflected laser beam pulse;
   delaying and reducing an amplitude of the voltage signal to produce a reduced amplitude delayed voltage signal corresponding to the reflected laser beam pulse; and
   subtracting the reduced amplitude delayed voltage signal corresponding to the reflected laser beam pulse from the voltage signal corresponding to the reflected laser beam pulse to produce a truncated pulse signal; and
   detecting an arrival time of a leading edge of the truncated pulse signal.

14. The method of claim 13 wherein reducing the amplitude of the voltage signal is performed after delaying the voltage signal.

15. The method of claim 13 wherein the voltage signal is an analog signal, and the delaying is performed in the analog domain using an analog delay line.

16. The method of claim 15 wherein the subtracting is performed in the analog domain using an analog amplifier.

17. The method of claim 13 further comprising converting the truncated pulse signal into the digital domain and detecting the arrival time using a digital micro-controller.

18. The method of claim 13 wherein the reduced amplitude delayed voltage signal is delayed by 3-30 nanoseconds.

19. The method of claim 13 further comprising a noise threshold for detecting the arrival time of the leading edge of the truncated pulse signal, wherein the noise threshold is 5-200 mV.

20. The method of claim 13 wherein reducing the amplitude provides a sufficient gain so that, upon subtraction of the reduced amplitude delayed voltage signal, a resulting signal decays to below a pulse detection threshold within an amount of time sufficient to allow detection of objects within a threshold distance.

* * * * *